May 21, 1968 N. LANE 3,384,380

RECORD PLAYER PICKUP ARMS

Filed Dec. 29, 1966 2 Sheets-Sheet 1

INVENTOR:
NORMAN LANE
BY Kurt Kelman
AGENT

RECORD PLAYER PICKUP ARMS

Filed Dec. 29, 1966 2 Sheets-Sheet 2

INVENTOR:
NORMAN LANE
BY Kurt Kelman
AGENT 3,384,380

RECORD PLAYER PICKUP ARMS

Norman Lane, Halesowen, England, assignor to BSR Limited, Old Hill, England, a British company Filed Dec. 29, 1966, Ser. No. 605,734
Claims priority, application Great Britain, Dec. 31, 1965, 55,330
10 Claims. (Cl. 274—23)

ABSTRACT OF THE DISCLOSURE

A pickup arm for a record player which carries a stylus at one end and is pivotally mounted, on a support post of the record player, about an axis transverse to the pickup arm and intermediate the ends thereof and which is provided with counter-balancing means so that the pickup arm is balanced about said axis of pivot. There being a spring connected between the pickup arm and the support post to pivot the arm in the direction to urge the stylus into contact with a record, and means being provided to adjust the force exerted by the spring on the arm. This means may comprise an arrangement whereby the distance through which the spring is stretched is varied.

This invention relates to pickup arm assemblies for record players and especially to the type of pickup arm assembly wherein the pickup arm, at one end thereof, is adapted to carry a stylus for engagement with a record groove and at or adjacent the other end thereof is pivotally mounted, for movement about a first axis, on a support post, counter-balancing means being provided to act upon the pickup arm in the direction to cause pivotal movement thereof about said first axis to lift the stylus from the record. Such pickup arm assemblies are referred to herein as of the type specified. Usually the support post is pivotally mounted on the record player deck at a position outside the periphery of the turntable for movement about a second axis parallel to the axis of rotation of the turntable and said first axis being normal to said second axis.

It is necessary, especially with modern long playing records, that the pressure which the stylus exerts on the record groove should be accurately adjusted since, if too high a pressure is exerted, then damage and/or undue wear of both the record groove and of the stylus may occur. In addition, in order to achieve good reproduction it is necessary that the stylus pressure is accurately adjusted to an optimum value.

The pickup arm, because it carries the stylus adjacent one end and is pivotally mounted at or adjacent its other end, imposes a considerable load on the stylus and, therefore, means have to be provided to counterbalance the pickup arm, and thereby reduce the stylus pressure, and, for the reasons given above, it is desirable that the pressure exerted by the stylus on the record may be adjusted. One of the ways in which this has been done hitherto is by providing a counter-weight on a short extension on the pickup arm on the side of the pivotal connection thereof to the support post distant from the stylus, means being provided whereby the position of the weight can be adjusted along the extension thus enabling some adjustment of the stylus pressure to be obtained. Another way in which the pickup arm has been counterbalanced is by providing a tension spring, of a suitable size to provide the desired tension, between a short extension of the pickup arm, on the side of its pivotal connection to the support post distant from the stylus, and the support post, the tension exerted by the spring tending to lift the end of the pickup arm which carries the stylus out of engagement with the record surface.

The object of the present invention is to provide a new or improved pickup arm assembly having means for adjusting the pressure exerted by the stylus on a record.

The invention is, in a pickup arm assembly for a record player including, a pickup arm, carrying a stylus adjacent one end thereof and pivotally mounted on a support post of a record player about an axis extending transversely of the pickup arm and spaced intermediate the ends thereof, counter-balancing means, counter-balancing the pickup arm about said axis and axially extendable spring means acting on the pickup arm in opposition to said counter-balancing means, the improvement comprising an adjustment member mounted on the pickup arm for rotary adjustment about said first axis, and said spring means being connected between said support post and said adjustment member, at a position spaced from said first axis, and intermediate its ends, being passed round a convexly curved surface provided on the pickup arm.

A record player having a pickup arm assembly embodying the present invention will now be described in detail by way of example with reference to the accompanying drawings wherein.

In order to facilitate the following description the record player will be described, in what may be regarded as the normal playing position of a record player, with the axis of rotation of the turntable being vertical, although it should be appreciated that the present invention may be applied to record players which may be operated in other orientations.

Figure 1:
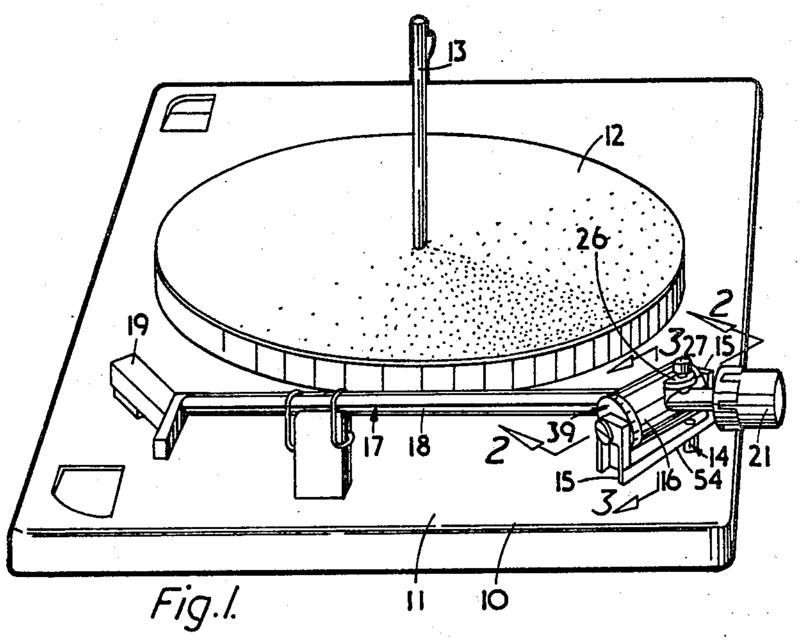
FIGURE 1 is a general perspective view of the record player.

Referring particularly to FIGURE 1, the record player, indicated generally at 10, includes a deck 11 on which a rotatable turntable 12 is mounted together with a record centre spindle 13. A support post 14, which may be of any convenient cross-section, is pivotally mounted on the deck plate 11 for movement about a vertical axis parallel to the record centre spindle 13.

The support post 14 is bifurcated at its upper end to form a yoke having two parallel, spaced apart arms 15. A body part 16 of a pickup arm 17 is pivotally mounted between the arms 15, as hereinafter to be described. The pickup arm 17, which is of a generally known type, comprises a circular tube 18 which carries, at its one end a cartridge 19 having a stylus, not shown, for engagement with a groove formed in a record placed on the turntable 12. At its other end the tube 18 carries a counter-weight 21 and intermediate its ends and closely adjacent the counter-weight 21 the tube 18 is engaged within the body part 16. Thus, the pickup arm 17 may pivot in a horizontal plane, as a result of the pivotal mounting of the support post 14 on the record deck 11, to enable the stylus to follow a groove formed in the record surface and the pickup arm 17 may also pivot in a vertical plane, as a result of its pivotal connection to the upper end of the support post 14, to enable the stylus to follow a groove formed in the record surface and the pickup arm 17 may also pivot in a vertical plane, as a result of its pivotal connection to the upper end of the support post 14, to enable the stylus to be engaged with and dis-engaged from the groove in the record.

It should be appreciated that the pickup arm may be counter-balanced by other means than the counterweight described hereinbefore, for example, a tension spring may be connected between the pickup arm, on the opposite side thereof to the body part 16 to the cartridge 19, and the support post 14.

Figure 2:
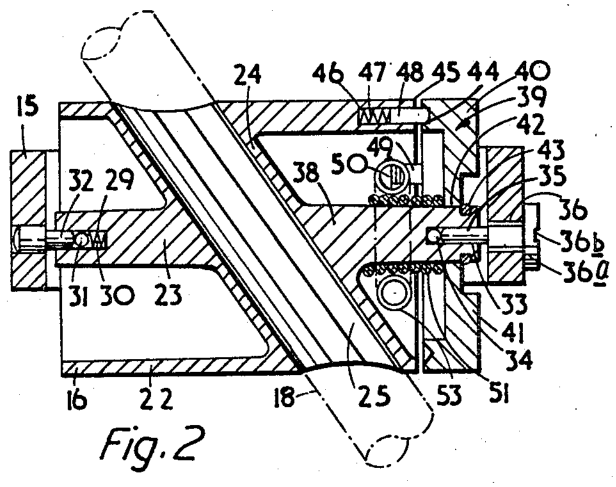
FIGURE 2 is a cross-section, to an enlarged scale, on the line 2—2 of FIGURE 1.
Figure 3:
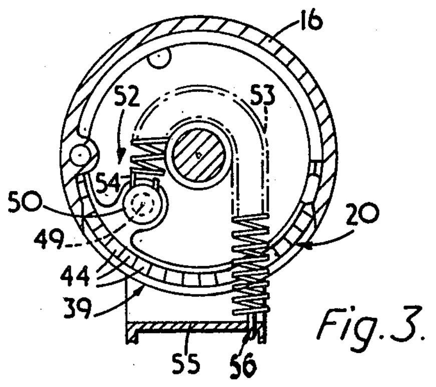
FIGURE 3 is a cross-section, to an enlarged scale, on the line 3—3 of FIGURE 1.
Figure 4:
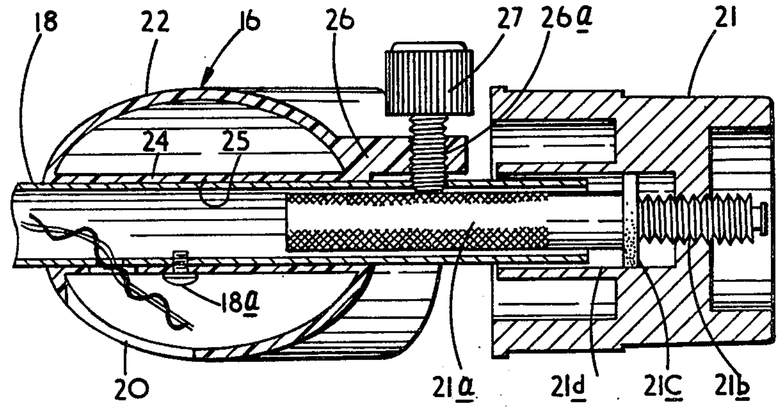
FIGURE 4 is a fragmentary longitudinal cross-section through the pickup arm and body part.

Referring now particularly to FIGURES 2 and 3, the body part 16 is of generally cylindrical overall shape, although it should be appreciated that the body part may be of any desired overall shape, and is made as a hollow one piece moulding in a suitable plastics material. The body part essentially includes a tubular outer part 22 and a cylindrical inner part 23 which is connected to the outer part 22 by an inclined transverse part 24, having a through bore which provides an inclined transverse passage 25 which is open at its ends. The cross-section of the passage 25 is semi-circular on one side of a diametrical plane and a half hexagonal on the other side of the plane.

The tube 18 of the pickup arm 17 is engaged within the transverse bore 25. The semi-circular part of the passage engaged snugly with the tube 18 whilst the half hexagonal part forms a truncated V-shaped seat for the tube 18. A self-tapping screw 18*a* is passed through an aperture formed in the cylindrical part 23 of the body and threadably engages within an aperture within the tube 18 to urge the tube on to its aforesaid seat and so secure the body part to the tube 18. A short length of the tube 18 extends on one side of the body part 16 and on this short end the hereinbefore mentioned counterweight 21 is provided. On the other side and body part 16 the majority of the tube 18 extends and on the end of this longer part there is mounted the cartridge 19.

The body part is provided with a lug 26 having a threaded aperture 26*a*, within which a clamping screw 27 is engaged. The clamping screw 27 passes through an aperture, not shown, in the tube 18 and the end of the clamping screw 27 is tightened into engagement with a spigot 21*a*, attached to the counterweight 21 and which is engaged within the tube 18. The counterweight 21 is formed with a threaded axial passage 21*b* within which a threaded part of the spigot 21*a* is engaged and a rubber washer 21*c* is engaged around the spigot 21*a* and resiliently engages with an unthreaded passage 21*d* of the counterweight 21. Thus, the position of the counterweight 21 relative to the tube 18 and the body part 16 may be adjusted approximately by untightening the screw 27 and sliding the counterweight 21 to the desired position and then re-tightening the screw. A fine adjustment of the position of the counterweight 21 is achieved by screwing the counterweight along the threaded portion of the spigot 21*a*, the rubber washer 21*c* acting as a friction brake to restrain accidental rotation of the counterweight 21. It will be seen that by adjusting the longitudinal position of the counterweight 21 then the pressure which the stylus exerts on a record groove may be approximately adjusted.

Although the transverse passage 25 is described herein as being inclined at an acute angle to the longitudinal axis of the body part 16, if desired, it may extend normally thereto and the longitudinal axis of the passage 25 may either intersect the longitudinal axis of the body part 16, as shown in the drawings, or they may be spaced apart.

At its one end the cylindrical inner part 23 is provided with an axial passage 29 of relatively small diameter and which extends for a short distance towards the centre of the body part 16. Within this passage 29 there is provided a helical compression spring 30 and a spherical ball 31, and also engaged within the passage 29 is a stud 32 which projects from within the associated arm 15 of the support post 14. The other end of the inner part 23 is provided with an axial cylindrical passage 33 of relatively small diameter which extends for a short distance towards the centre of the body part 16. A spherical ball 34 is provided within this recess and a stud 35 is also engaged within this passage. The stud 35 is provided with a screw threaded part 36 and a head 36*a* having a screwdriver engageable recess 36*b*. The part 36 is threadably engaged within a threaded recess 37 formed in the said other arm 15, and hence, the stud 35 may be removed from the support post 14 for assembly and dis-assembly and may be adjusted axially to enable adjustment of the tightness of the pivotal connection so that the pickup arm 17 may pivot freely without any looseness in the pivotal connection.

Hence, the two studs 33 and 35 provided one in each arm 15 of the yoke, which are engaged within their associated passages 29 and 33 respectively in the body part 16 provide the first axis about which the pickup arm 17 pivots in a vertical plane.

A section of the wall of the tubular outer part 22 is cut away for about half the length thereof to provide a generally rectangular aperture 20 in the wall for a purpose hereinafter to be described.

The part 38, of the inner part 23 of the body member 16 between the part 24 and the said other end of the inner part 23 which has the passage 33 formed therein, constitutes an axially extending boss and this part 38 extends outwardly beyond the end of the outer part 22 of the body part 16. A sleeve 39, formed as a one piece moulding in a suitable plastics material has a tubular outer part 40 and a disc shaped part 41 having a central aperture 42 which is engaged with the part 38 to rotatably mount the sleeve part 39 thereon.

The sleeve 39 is of the same diameter as the diameter of the cylindrical body part 16 and hence appears, to the eye, to be an extension of the cylindrical body part 16. A retaining spring 43 engaged in a groove in the part 38 is provided adjacent the extreme end of the part 38 to retain the sleeve part 39 in position, although if desired, any other convenient retaining means may be provided.

A plurality of recesses 44 are provided around an annular region of the outer part 40 of the sleeve 39 which faces the end of the cylindrical body part 16 and in the adjacent end 45 of the cylindrical part 16 a cylindrical recess 46 is formed in which there is provided a coil compression spring 47 and a detent peg 48. The spring 47 resiliently urges the detent peg 48 into engagement with one of the recesses 44 so as to locate the sleeve part 39 relative to the body part 16 in any desired one of a plurality of relative angular positions. If desired, the plurality of recesses may be provided in the body part 16 and the spring loaded detent peg 48 may be provided in the sleeve. If desired, any other suitable means for locating the sleeve relative to the body part may be used.

The sleeve part 39, on the face of the disc part 41 thereof which faces the end face 45 of the body part 16 carries an anchor post 49 which extends parallel to the longitudinal axis of the body part 16. The anchor post 49 is provided with a head 50. A collar spring 51 is engaged around the boss 38 between the sleeve part 39 and the portion 24 of the body part 16.

One end 52 of a coil tension spring 53 is formed within an elongated loop 54 which is engaged with the anchor post 49, the enlarged head 50 of which prevents the loop 54 slipping therefrom. The spring 52 is then wrapped around part of the cylindrical surface of the part 38 over the collar spring 51 and then extends downwardly and outwardly of the body part 16, through the aperture 20 formed in the wall of the part 22 thereof as mentioned hereinbefore, to the base 55 of the yoke of the support post 14 to which the other end 56 of the spring is secured. Hence, the coil spring 53 tends to rotate the sleeve part 39 about the inner part 38 of the cylindrical body part 16, but since the sleeve part 39 is locked to the body part 16, the body part 16 itself is caused to rotate about its pivotal connection to the support post 14.

It will be seen, therefore, that by rotating the sleeve part 39 relative to the cylindrical body part 16 the anchor post 49 may be moved angularly relative to the body part 16 and hence the extent to which the tension spring 53 is wrapped around the boss 38 may be varied and hence the total distance by which the tension spring 53 is stretched may also be varied and hence the force exerted on the body part 16 tending to turn it about its pivotal connection to the support post 14 is also varied and thus the pressure exerted by the stylus may be adjusted. The sleeve part 39 may be graduated with any suitable graduations, the pressure exerted by the stylus in grammes may be graduated on the sleeve, so that any desired stylus pressure may be achieved merely by rotating the sleeve 39 relative to the body part 16 until the desired pressure may be achieved and the desired graduation is opposite the index marker provided on the body part 16.

Thus, in operation the counter-weight 21 is adjusted longitudinally along the tube 18 as described hereinbefore, until the pickup arm 17 is just balanced when the sleeve 39 is set at its zero position. When the sleeve is so set there is no tension in the spring and the anchor post 49 is dis-engaged from the end of the loop 54 and so the pickup arm is free to move without interference from the spring and so may be balanced by longitudinal adjustment of the counter-weight 21 as mentioned hereinbefore. It should, however, be appreciated that the spring, besides tending to rotate the sleeve because of its axial extension also tends to rotate the sleeve due to the tendency of the spring to straighten; but as this second effect is relatively constant, the desired stylus pressure may be achieved by rotating the sleeve 39 to vary the tension in the spring.

The desired stylus pressure is thus set on the sleeve 39 and the tension spring 53 thus pulls the pickup arm 17 downwardly against the bias of the counter-weight 21 and hence urges the stylus into contact with a record groove at the desired pressure.

It will be appreciated that the present invention provides a simple, convenient and accurate means whereby the pressure exerted by a record player stylus on a record groove may be adjusted to any one of a predetermined range of values.

What I claim then is:

1. In a pickup arm assembly for a record player including, a pickup arm, carrying a stylus adjacent one end thereof and pivotally mounted on a support post of a record player about an axis extending transversely of the pickup arm and spaced intermediate the ends thereof, counter-balancing means counter-balancing the pickup arm about said axis and axially extendable spring means acting on the pickup arm in opposition to said counter-balancing means, the improvement comprising an adjustment member mounted on the pickup arm for rotary adjustment about said first axis, and said spring means being connected between said support post and said adjustment member, at a position spaced from said first axis, and, intermediate its ends, being passed round a convexly curved surface provided on the pickup arm.

2. The improvement according to claim 1 wherein a body part is secured to said pickup arm and is pivotally mounted on the support post to mount the pickup arm thereon for movement about said first axis, said body part having a portion the surface of which portion provides said convex surface, and said surface constituting at least part of the surface of a cylinder coaxial with said axis, and wherein a sleeve, constituting said adjustable member, is mounted on said body part for rotary adjustment relative thereto about said first axis.

3. The improvement according to claim 2, wherein the sleeve and body parts are provided with co-operating spring loaded detent and socket locating means to locate the sleeve in any desired one of a plurality of angular positions relative to the body part.

4. The improvement according to claim 3, wherein the sleeve and body parts are provided with co-operating calibrations and indexing means to enable the stylus pressure to be set to any desired value within a predetermined range of values.

5. The improvement according to claim 3 wherein said surface is cylindrical.

6. The improvement according to claim 5, wherein a collar spring is interposed between the boss and the spring to provide a bearing for the spring.

7. The improvement according to claim 6, wherein the spring is a coil tension spring.

8. The improvement according to claim 6, wherein the body part is of generally cylindrical overall shape and has a cylindrical axial boss to provide said convex surface and said sleeve part being of generally disc shape and of the same overall diameter as the diameter of the cylindrical body part and being mounted for rotation on said boss, the longitudinal axis of the cylindrical part and of the sleeve part being co-axial with said first axis.

9. The improvement according to claim 8, wherein the counter-balancing means is a counter-weight mounted on the pickup arm on the side of said first axis distant from the stylus, and means being provided for adjusting the position of the counter-weight longitudinally relative to the pickup arm.

10. The improvement according to claim 9, wherein said adjustment means comprises a spigot slidably mounted within the pickup arm and clamping means whereby the spigot may be clamped to the pickup arm in any desired one of a range of longitudinal positions to approximately locate the counter-weight, said spigot being threadably engaged within the counter-weight so that fine adjustment of the position of the counter-weight may be achieved by screwing the counter-weight longitudinally of the spigot.

References Cited

UNITED STATES PATENTS

| | | | |
|---|---|---|---|
| 2,551,506 | 5/1951 | Rockwell | 274—23 |
| 2,858,135 | 10/1958 | Sherwood | 274—23 X |
| 3,020,051 | 2/1962 | Zimmermann et al. | 274—23 |
| 3,129,008 | 4/1964 | Suzuki et al. | 274—23 |
| 3,227,459 | 1/1966 | Haines | 274—23 |

FOREIGN PATENTS

| | | |
|---|---|---|
| 81,206 | 10/1956 | Denmark. |
| 711,443 | 6/1931 | France. |
| 1,029,174 | 4/1958 | Germany. |

HARRY N. HAROIAN, *Primary Examiner.*